US009176928B2

(12) United States Patent
DeLaquil et al.

(10) Patent No.: US 9,176,928 B2
(45) Date of Patent: Nov. 3, 2015

(54) SYSTEM FOR CONVERGENCE EVALUATION FOR STATIONARY METHOD ITERATIVE LINEAR SOLVERS

(75) Inventors: Matthew P. DeLaquil, Rockwall, TX (US); Deepak Prasanna, Rockwall, TX (US); Antone L. Kusmanoff, Greenville, TX (US)

(73) Assignee: L3 Communication Integrated Systems, L.P.

( * ) Notice: Subject to any disclaimer, the term of this patent is extended or adjusted under 35 U.S.C. 154(b) by 1249 days.

(21) Appl. No.: 12/498,808

(22) Filed: Jul. 7, 2009

(65) Prior Publication Data

US 2011/0010410 A1  Jan. 13, 2011

(51) Int. Cl.
| | |
|---|---|
| *G06F 17/14* | (2006.01) |
| *G06F 7/38* | (2006.01) |
| *G06F 7/32* | (2006.01) |
| *H03M 13/00* | (2006.01) |
| *G06F 17/12* | (2006.01) |

(52) U.S. Cl.
CPC ..................................... *G06F 17/12* (2013.01)

(58) Field of Classification Search
CPC ......... G06F 17/12; G06F 17/11; G06F 17/16; G06F 7/14; G06F 2212/454
USPC .................. 708/446, 551, 801; 382/166, 275; 714/755; 375/340; 707/102; 370/342
See application file for complete search history.

(56) References Cited

U.S. PATENT DOCUMENTS

| | | | | | |
|---|---|---|---|---|---|
| 5,046,846 | A | * | 9/1991 | Ray et al. | 356/326 |
| 5,343,554 | A | * | 8/1994 | Koza et al. | 706/13 |
| 5,604,911 | A | * | 2/1997 | Ushiro | 703/2 |
| 5,671,327 | A | * | 9/1997 | Akamine et al. | 704/219 |
| 5,867,416 | A | * | 2/1999 | Feldmann et al. | 708/801 |
| 5,995,905 | A | * | 11/1999 | Ikelle et al. | 702/16 |
| 6,163,870 | A | * | 12/2000 | Luby et al. | 714/755 |
| 6,169,970 | B1 | * | 1/2001 | Kleijn | 704/219 |
| 6,691,266 | B1 | * | 2/2004 | Winegarden et al. | 714/724 |
| 6,836,783 | B1 | * | 12/2004 | Lyke et al. | 708/3 |
| 7,155,057 | B2 | * | 12/2006 | Kondo | 382/166 |
| 7,526,418 | B2 | * | 4/2009 | Pita et al. | 703/10 |
| 7,729,892 | B2 | * | 6/2010 | Tobita et al. | 703/2 |
| 7,814,441 | B2 | * | 10/2010 | Bae et al. | 345/420 |
| 7,853,636 | B2 | * | 12/2010 | New et al. | 708/551 |
| 8,068,535 | B2 | * | 11/2011 | Cairns et al. | 375/148 |
| 8,166,090 | B2 | * | 4/2012 | DeLaquil et al. | 708/446 |
| 2002/0191577 | A1 | * | 12/2002 | Pan et al. | 370/342 |
| 2003/0212723 | A1 | * | 11/2003 | Quintero-de-la-Garza | 708/446 |
| 2004/0120564 | A1 | * | 6/2004 | Gines | 382/131 |
| 2008/0089448 | A1 | * | 4/2008 | Martinot et al. | 375/340 |
| 2008/0294686 | A1 | * | 11/2008 | Long et al. | 707/103 R |
| 2009/0172052 | A1 | * | 7/2009 | DeLaquil et al. | 708/109 |
| 2009/0313282 | A1 | * | 12/2009 | Bhagwan et al. | 707/102 |

* cited by examiner

*Primary Examiner* — Farley Abad
*Assistant Examiner* — Henry Yu
(74) *Attorney, Agent, or Firm* — Hovey Williams LLP

(57) ABSTRACT

A system for evaluating the convergence to a solution for a matrix equation comprises at least one reconfigurable computing device such as a field programmable gate array (FPGA), an update storage element, a conversion element, a summation unit, and a comparator. The FPGA includes a plurality of configurable logic elements and a plurality of configurable storage elements, which are utilized to form the update storage element, the conversion element, the summation unit, and the comparator. The update storage element is configured to store a plurality of updates. The conversion element determines the absolute value of the updates. The summation unit accumulates the absolute values of the updates to produce a total sum, which is compared to a convergence factor by the comparator. Convergence is signaled when the total sum is less than the convergence factor.

19 Claims, 5 Drawing Sheets

SYSTEM FOR CONVERGENCE EVALUATION FOR STATIONARY METHOD ITERATIVE LINEAR SOLVERS

BACKGROUND OF THE INVENTION

1. Field of the Invention

Embodiments of the present invention relate to high-performance computing. More particularly, embodiments of the present invention relate to systems and methods for evaluating the convergence to a solution of a matrix equation for stationary method iterative linear solvers.

2. Description of the Related Art

The solution to large-scale matrix equations is often required in a wide variety of scientific and engineering fields. The matrix equation may take the form Ax=b, where A is a known n×n matrix, b is a known vector of size n, and x is an unknown vector if size n. Many times a stationary method iterative linear solver, such as Jacobi, Gauss-Seidel, or variations thereof, is employed to find a solution. The solver may perform a number of iterations, such that during each iteration the solver updates the solution vector. Traditional approaches include allowing the solver to perform a fixed number of iterations. There are a couple of drawbacks to this approach. The solver may perform too few iterations to converge toward a solution, thereby providing an erroneous or inadequate answer. Alternatively, the solver may perform more iterations than are necessary to provide an adequate solution, thus wasting time and unnecessarily utilizing resources.

SUMMARY OF THE INVENTION

Embodiments of the present invention solve the above-mentioned problems and provide a distinct advance in the art of high-performance computing. More particularly, embodiments of the invention provide a system that includes reconfigurable computing devices which evaluate the convergence to a solution for a matrix equation for stationary method linear iterative solvers.

Various embodiments of the system comprise at least one reconfigurable computing device such as a field programmable gate array (FPGA), a communication destination element, an update storage element, a conversion element, a summation unit, and a comparator.

The FPGA includes a plurality of configurable logic elements and a plurality of configurable storage elements, which are utilized to form the communication destination element, the update storage element, the conversion element, the summation unit, and the comparator.

The communication destination element may receive a plurality of updates from an external iterative linear solver and may forward the updates to the update storage element. The update storage element may store the plurality of updates. The conversion element may receive the plurality of updates from the update storage element and may determine the absolute value of each of the updates.

The summation unit may accumulate the absolute values of the updates to produce a total sum. The comparator may compare the total sum to a convergence factor and may signal convergence when the total sum is less than the convergence factor.

A second embodiment of the system may comprise a plurality of FPGAs, a plurality of update summation units, a global convergence unit, and a plurality of inter FPGA links.

Each update summation unit may include a first communication destination element, a storage element, a conversion element, a first summation unit, and a communication source element. The first communication element may receive a portion of a plurality of updates from an external iterative linear solver. The storage element may store the portion of the plurality of updates. The conversion element may determine the absolute value of each of the updates. The first summation unit may accumulate the absolute value of the portion of the updates to form a partial sum. The communication source element may transmit the partial sum to the global convergence unit.

The global convergence unit may include a second communication destination element, a second summation unit, and a comparator. The second communication destination element may receive the plurality of partial sums from the update summation units. The second summation unit may accumulate the partial sums to calculate a total sum. The comparator may compare the total sum to a convergence factor and may signal convergence when the total sum is less than the convergence factor.

Other embodiments of the invention comprise a method of evaluating the convergence to a solution for a matrix equation. The method may include the steps of: receiving in an FPGA a plurality of updates from an external iterative linear solver, determining the absolute value of each of the plurality of updates utilizing a conversion element, accumulating the absolute value of the plurality of updates utilizing a summation unit, comparing the accumulated value to a convergence factor utilizing a comparator, generating a signal if the accumulated value is less than the convergence factor, and transmitting the signal to the iterative linear solver to initiate the calculation of a solution for a new matrix equation.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
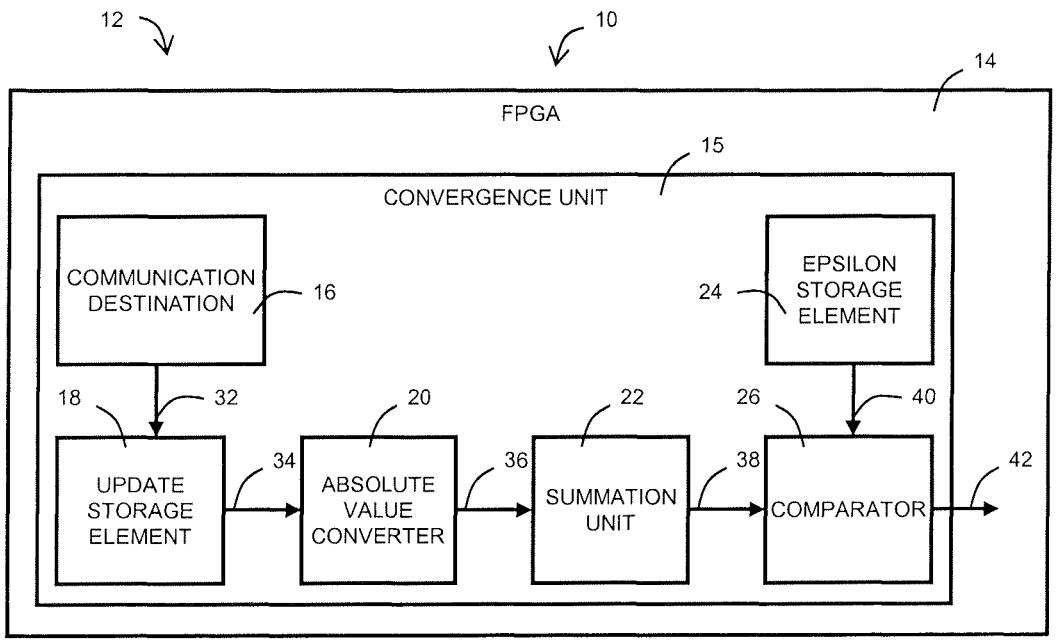
FIG. 1 is a schematic diagram of a system for convergence evaluation constructed in accordance with various embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

A system 10 for evaluating the convergence to a solution of a matrix equation for stationary method linear iterative solvers, as constructed in accordance with various embodiments of the current invention, is shown in FIG. 1. The system 10 may broadly comprise at least one reconfigurable computing device 12, such as a field programmable gate array (FPGA) 14, and a convergence unit 15, which further includes a communication destination element 16, an update storage element 18, an absolute value converter 20, a summation unit 22, an epsilon storage element 24, and a comparator 26.

The system 10 generally works with stationary method linear iterative solvers, such as Jacobi, Gauss-Seidel, or variations thereof, that find the solution to a matrix equation with the form Ax=b, where A is a known n×n matrix (referred to as the "A-matrix"), b is a known vector of size n (referred to as the "b-vector"), and x is an unknown vector of size n (referred to as the "x-vector" or alternatively the "solution vector"). The matrix and the two vectors may all have a total of n rows. For a large scale matrix equation, n may be in the millions. The matrix equation may be expanded as shown in EQ. 1:

$$\begin{bmatrix} A_{11} & A_{12} & \ldots & A_{1n} \\ A_{21} & A_{22} & \ldots & A_{2n} \\ \vdots & \vdots & \ddots & \vdots \\ A_{n1} & A_{n2} & \ldots & A_{nn} \end{bmatrix} \begin{bmatrix} x_1 \\ x_2 \\ \vdots \\ x_n \end{bmatrix} = \begin{bmatrix} b_1 \\ b_2 \\ \vdots \\ b_n \end{bmatrix} \quad \text{EQ. 1}$$

A stationary approach to solving the matrix equation for x involves approximating an initial solution for x and then iteratively solving the matrix equation to find successive solutions for x, where the solution for x at each iteration does not depend on the iteration. The approach may include solving EQ. 2 for one element of the x-vector for one iteration, as shown:

$$x_{r\_next} = x_r + \Delta x_r \quad \text{EQ. 2}$$

wherein $x_{r\_next}$ is the value of the element of the x-vector in row r that is being calculated in the current iteration, $x_r$ is the value of the element of the x-vector in row r that was calculated in the last iteration, and $\Delta x_r$ is the incremental change of $x_r$, also known as an update.

Examples of iterative linear solvers that find a solution to the matrix equation, EQ. 1 above, are disclosed in "TILED ARCHITECTURE FOR STATIONARY-METHOD ITERATIVE LINEAR SOLVERS ON RECONFIGURABLE COMPUTING SYSTEMS", U.S. patent application Ser. No. 11/966,633, filed Dec. 28, 2007, and "A SYSTEM FOR MATRIX PARTITIONING IN LARGE-SCALE SPARSE MATRIX LINEAR SOLVERS", U.S. patent application Ser. No. 12/347,407, filed Dec. 31, 2007.

Figure 2:
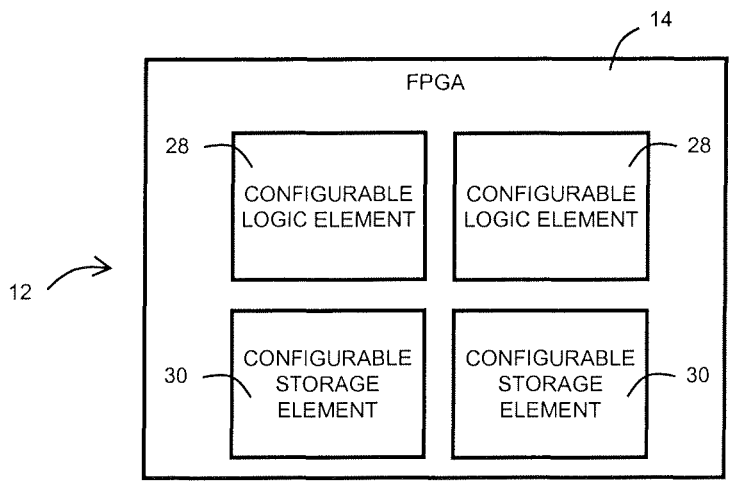
FIG. 2 is a schematic diagram of a field programmable gate array.

The FPGA 14 generally provides the resources to implement the communication destination element 16, the update storage elements 18, the absolute value converter 20, the summation unit 22, the epsilon storage element 24, and the comparator 26. The FPGA 14, as seen in FIG. 2, may include configurable logic elements 28 or blocks, such as standard gate array components that include combinational logic gates (e.g., AND, OR, and NOT) and latches or registers, programmable switch and interconnect networks, configurable storage elements 30 such as random-access memory (RAM) components, and input/output (I/O) pads. The FPGA 14 may also include specialized functional blocks such as arithmetic/logic units (ALUs) that include high-performance adders and multipliers, or communications blocks for standardized protocols. An example of the FPGA 14 is the Xilinx Virtex™ series, particularly the Virtex™2Pro FPGA, from Xilinx, Inc. of San Jose, Calif.

The FPGA 14 may be programmed in a generally traditional manner using electronic programming hardware that couples to standard computing equipment, such as a workstation, a desktop computer, or a laptop computer. The functional description or behavior of the circuitry may be programmed by writing code using a hardware description language (HDL), such as very high-speed integrated circuit hardware description language (VHDL) or Verilog, which is then synthesized and/or compiled to program the FPGA 14. Alternatively, a schematic of the circuit may be drawn using a computer-aided drafting or design (CAD) program, which is then converted into FPGA 14 programmable code using electronic design automation (EDA) software tools, such as a schematic-capture program. The FPGA 14 may be physically programmed or configured using FPGA programming equipment, as is known in the art.

The communication destination element 16 generally receives data that is communicated from the external iterative linear solver that is implemented either in the same FPGA 14 or in an external system. The iterative linear solver is computing the solution for the x-vector, from EQ. 1, in multiple iterations. The data generally includes the update of the solution vector, $\Delta x_r$, at each iteration. The communication destination element 16 may output a first update signal 32.

The communication destination element 16 may be formed from configurable logic elements 28 such as combinational logic gates, multiplexers, demultiplexers, crossbar or crossover or crosspoint switches, combinations thereof, and the like. The communication destination element 16 may also be formed from configurable storage elements 30, such as first-in, first-out registers (FIFOs), single-port or multi-port RAM elements, memory cells, registers, latches, flip-flops, combinations thereof, and the like. The communication destination element 16 may also include built-in components of the FPGA 14, and may further be implemented through one or more code segments of an HDL. In addition, the communication destination element 16 may include an architecture such as the one described in "SWITCH-BASED PARALLEL DISTRIBUTED CACHE ARCHITECTURE FOR MEMORY ACCESS ON RECONFIGURABLE COMPUTING PLATFORMS", U.S. patent application Ser. No. 11/969,003, filed Jan. 3, 2008, which is herein incorporated by reference in its entirety.

The update storage element 18 receives the update, $\Delta x_r$, from the communication destination element 16 and temporarily stores the update until the absolute value converter and the summation unit are ready to receive the update. This allows the update to be received at one rate and the convergence evaluation to be performed at a different rate. The update storage element 18 may receive the first update signal 32 from the communication destination element 16 and may generate a second update signal 34. The data of the second update signal 34 may be substantially the same as the data of the first update signal 32 that has just been temporarily stored.

The update storage element 18 may be formed from configurable storage elements 30, such as FIFOs, single-port or multi-port RAM elements, memory cells, registers, latches, flip-flops, combinations thereof, and the like. The update storage element 18 may also include built-in components of the FPGA 14, and may further be implemented through one or more code segments of an HDL.

The absolute value converter 20 generally determines the magnitude of the update by inverting the sign of a negative value of the update and not changing a positive value of the update. The absolute value converter 20 may receive the second update signal 34 from the update storage element 18 and may generate an absolute value signal 36.

The absolute value converter 20 may be formed from configurable logic elements 28 such as combinational logic gates, e.g., inverters, or more complex blocks such as encoders, decoders, multiplexers, demultiplexers, combinations thereof, and the like. The absolute value converter 20 may also be formed from configurable storage elements 30, such as memory cells, registers, latches, flip-flops, combinations thereof, and the like. Additionally, the absolute value converter 20 may also include built-in components of the FPGA 14, and may further be implemented through one or more code segments of an HDL.

The summation unit 22 generally accumulates the absolute values of all of the updates into a total sum. The summation unit 22 may receive the absolute value signal 36 from the absolute value converter 20 and may generate an update sum 38.

The summation unit 22 may be formed from configurable logic elements 28 such as combinational logic gates, half-adders, full-adders, carry-look ahead adders, combinations thereof, and the like. The summation unit 22 may also be formed from configurable storage elements 30, such as memory cells, registers, latches, flip-flops, combinations thereof, and the like. Additionally, the summation unit 22 may also include built-in components of the FPGA 14, and may further be implemented through one or more code segments of an HDL.

The epsilon storage element 24 generally stores a value, $\epsilon$ or epsilon, to compare to the average value of the update, as explained in more detail below. The magnitude of epsilon is typically fairly small and may be on the order of 0.001 or less. The epsilon storage element 24 may store epsilon in addition to a convergence factor, N-epsilon, which equals N×epsilon, where N is the size of the x-vector. The convergence factor may be adjusted by a user to change the computation time, the quality of the solution, or another parameter.

The epsilon storage element 24 may be formed from configurable storage elements 30, such as FIFOs, single-port or multi-port RAM elements, memory cells, registers, latches, flip-flops, combinations thereof, and the like. The epsilon storage element 24 may also be formed from configurable logic elements 28 such as combinational logic gates, multipliers, shift registers, combinations thereof, and the like. The epsilon storage element 24 may also include built-in components of the FPGA 14, and may further be implemented through one or more code segments of an HDL.

The comparator 26 generally compares the total sum of the updates with N-epsilon. If the total sum is less than N-epsilon, then convergence of the solution of the x-vector has been achieved and the comparator may generate a solution signal 42 to indicate a solution to the matrix equation has been found. The solution signal 42 may be transmitted to the external iterative linear solver, at which point the solver may be interrupted and cease its current calculations, and furthermore may receive the data set for a new matrix equation to solve. On the other hand, if the total sum is greater than or equal to N-epsilon, the system 10 receives the updates for the next iteration of the x-vector solution from the iterative linear solver.

The comparator 26 may receive the update sum 38 from the summation unit 22 and the epsilon signal 40 from the epsilon storage element 24. The comparator 26 may be formed from configurable logic elements 28 such as combinational logic gates, e.g., AND, OR, and NOT gates, multiplexers, encoders, decoders, binary comparative circuitry, and combinations thereof, as well as components for transmitting a signal. The comparator 26 may also include configurable storage elements 30, such as memory cells, registers, latches, flip-flops, combinations thereof, and the like. Additionally, the comparator 26 may also include built-in components of the FPGA 14, and may further be implemented through one or more code segments of an HDL.

Figure 3:
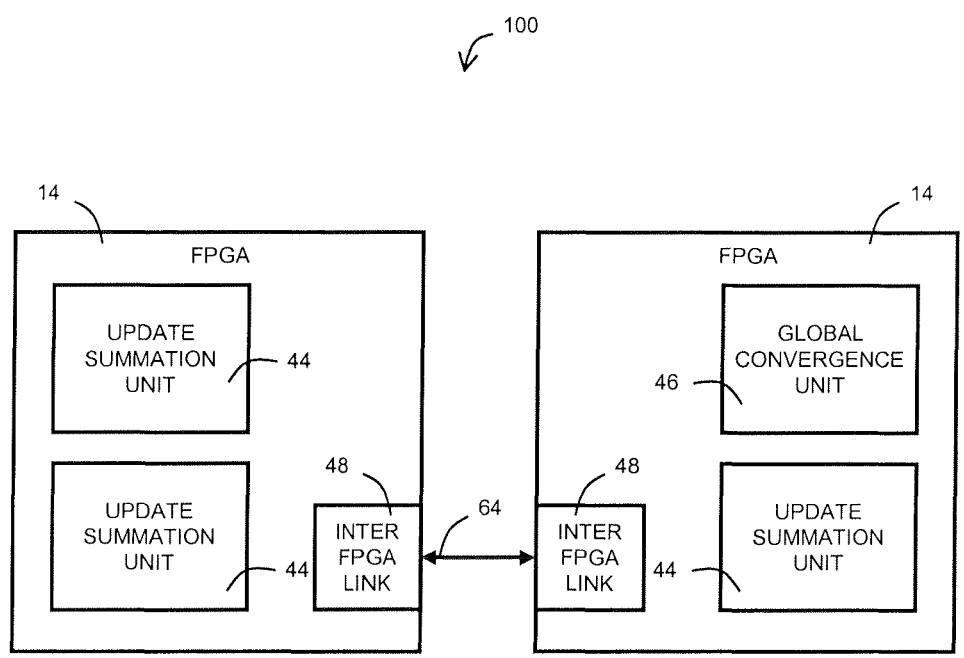
FIG. 3 is a schematic diagram of a second embodiment of the system for convergence evaluation.
Figure 4:
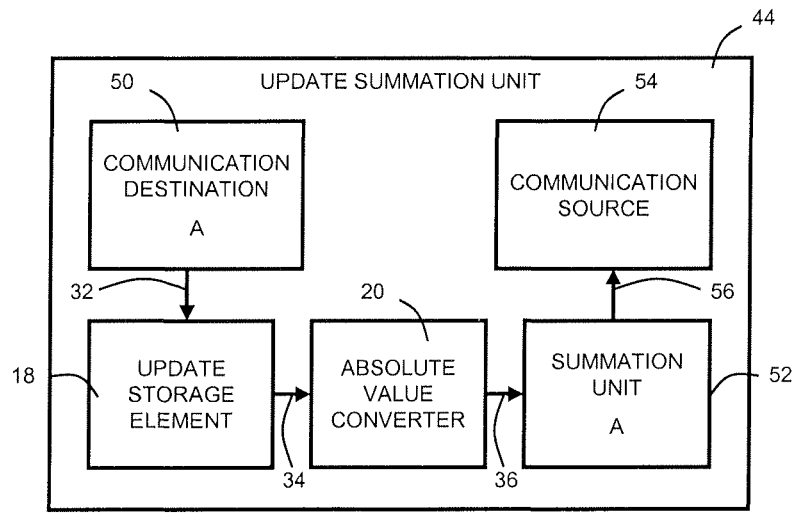
FIG. 4 is a schematic diagram of an update summation unit.
Figure 5:
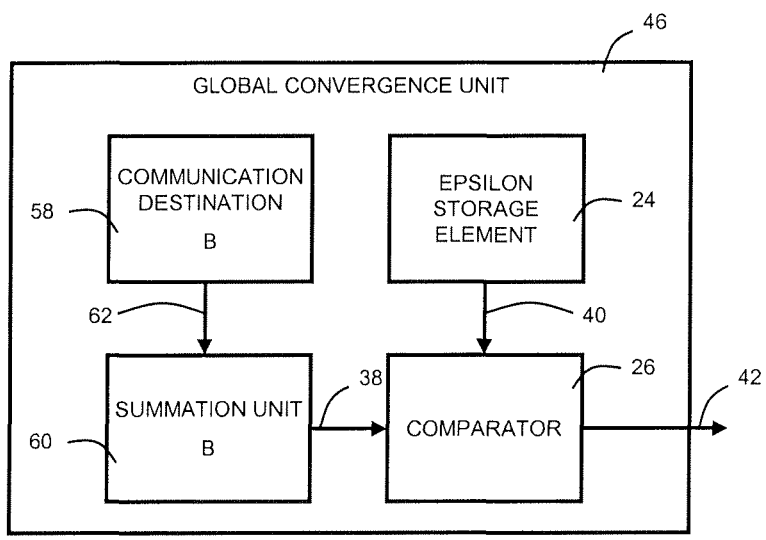
FIG. 5 is a schematic diagram of a global convergence unit.

A second embodiment of the system 100 is shown in FIG. 3. The system 100 may comprise a plurality of FPGAs 14, a plurality of update summation units 44, a global convergence unit 46, and a plurality of inter FPGA links 48. The second embodiment of the system 100 is generally utilized when the matrix equation is particularly large such that the summation of the updates is executed on two or more FPGAs.

Each update summation unit 44 generally receives a portion of the updates from the external iterative linear solver and calculates a partial sum of the absolute values of the updates. The update summation unit 44 may include a first communication destination element 50, the update storage element 18, the absolute value converter 20, a first summation unit 52, and a communication source element 54.

The first communication destination element 50 is constructed and functions substantially similar to the communication destination element 16 described above. The first summation unit 52 is constructed and functions substantially similar to the summation unit 22 described above, except that the first summation unit 52 may generate a partial sum output signal 56 that represents the partial sum of the absolute values of the updates.

The communication source element 54 generally transmits the partial sum to be received by the global convergence unit 46. The partial sum output signal 56 is input from the first summation unit 52.

The communication source element 54 may be formed from configurable logic elements 28 such as combinational logic gates, multiplexers, demultiplexers, crossbar or crossover or crosspoint switches, combinations thereof, and the like. The communication source element 54 may also be formed from configurable storage elements 30, such as first-in, first-out registers (FIFOs), single-port or multi-port RAM elements, memory cells, registers, latches, flip-flops, combinations thereof, and the like. The communication source element 54 may also include built-in components of the FPGA 14, and may further be implemented through one or more code segments of an HDL.

The global convergence unit 46 generally adds the partial sums from the plurality of update summation units 44 and compares the total sum with N-epsilon in a substantially similar fashion as described above. The global convergence unit 46 includes a second communication destination element 58, a second summation unit 60, the epsilon storage element 24, and the comparator 26.

The second communication destination element 58 is constructed and functions substantially similar to the first communication destination element 50 described above, except that the second communication destination element 58 receives all the partial sums from the communication source elements 54 of the plurality of update summation units 44.

The second communication destination element 58 also generates a partial sum input signal 62.

The second summation unit 60 is constructed and functions substantially similar to the first summation unit 52 described above, except that the second summation unit 60 accumulates partial sums to produce the total sum of the updates. The second summation unit 60 receives the partial sum input signal 62 from the second communication destination element 58 and outputs the update sum 38.

The epsilon storage element 24 and the comparator 26 are constructed and function substantially similar as described above. The comparator 26 generates the solution signal 42 when the total sum is less than N-epsilon, as discussed above.

The inter FPGA link 48 generally allows communication from the components, such as the update summation units 44, on one FPGA 14 to the components, such as the global convergence unit 46, on another FPGA 14. The inter FPGA link 48 may buffer the data and add packet data, serialize the data, or otherwise prepare the data for transmission.

The inter FPGA link 48 may include buffers in the form of flip-flops, latches, registers, SRAM, DRAM, and the like, as well as shift registers or serialize-deserialize (SERDES) components. The inter FPGA link 48 may be a built-in functional FPGA block or may be formed from one or more code segments of an HDL or one or more schematic drawings. The inter FPGA link 48 may also be compatible with or include Gigabit Transceiver (GT) components, as are known in the art. The inter FPGA link 48 may couple to an inter FPGA bus 64 to communicate with another FPGA 14.

The inter FPGA bus 64 generally carries data from one FPGA 14 to another FPGA 14 and is coupled with the inter FPGA link 48 of each FPGA 14. The inter FPGA bus 64 may be a single-channel serial line, wherein all the data is transmitted in serial fashion, a multi-channel (or multi-bit) parallel link, wherein different bits of the data are transmitted on different channels, or variations thereof, wherein the inter FPGA bus 64 may include multiple lanes of bi-directional data links. The inter FPGA bus 64 may be compatible with GTP components included in the inter FPGA link 48. The inter FPGA link 48 and the inter FPGA bus 64 may also be implemented as disclosed in U.S. Pat. No. 7,444,454, issued Oct. 28, 2008, which is hereby incorporated by reference in its entirety.

The system 10, 100 may operate as follows. The external iterative linear solver that is calculating the solution to the matrix equation, as shown in EQ. 1, may transmit updates of the solution vector to the system 10, 100. The updates may be received by the communication destination element 16 in the convergence unit 15 or the first communication destination element 50 in the update summation unit 44. The updates are stored as needed in the update storage element 18. The absolute value of each update is then determined by the absolute value converter 20. The absolute values are accumulated by the summation unit 22 of the convergence unit 15 or the first summation unit 52 followed by the second summation unit 60 in the second embodiment of the system 100.

The result of the accumulation is a total sum which is compared to N-epsilon by the comparator. If the total sum is greater than or equal to N-epsilon, then the solution has not yet converged, so the system does nothing except to receive the updates of the next iteration of calculations from the iterative linear solver. It is assumed that the external iterative linear solver operates independently from the system 10, 100. If the total sum is less than N-epsilon, then comparator generates the solution signal 42 which may be transmitted to the iterative linear solver, indicating that a solution to the matrix equation has been found, at which point the solver may cease its current calculations and may receive the data set for a new matrix equation to solve.

Figure 6A:
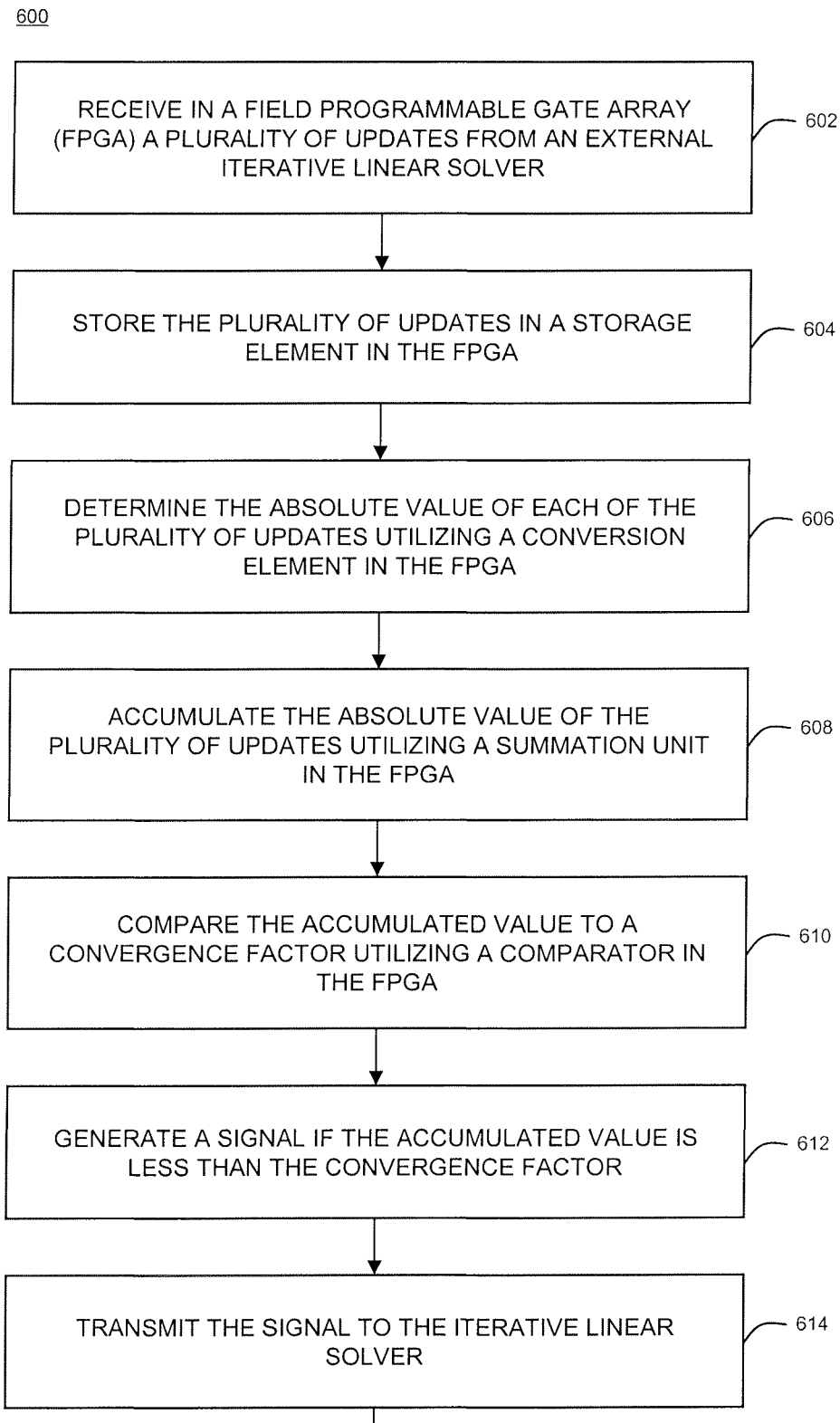
FIG. 6A and FIG. 6B are a flow diagram of at least a portion of the steps performed for a method of evaluating the convergence to a solution of a matrix equation.
Figure 6B:
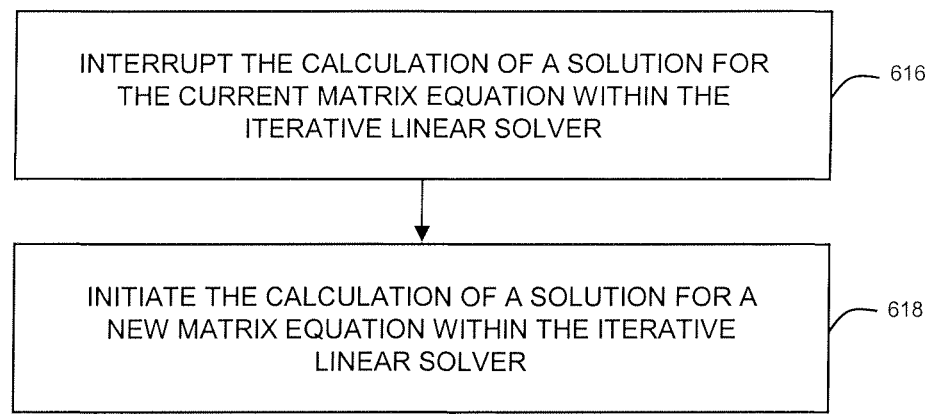

At least a portion of the steps of a method 600 of evaluating the convergence to a solution of a matrix equation in accordance with various embodiments of the present invention is shown in FIGS. 6A and 6B. Some steps may be performed concurrently instead of sequentially, as shown. Additionally, some steps may be performed in reverse order from what is shown in FIGS. 6A and 6B.

In connection with step 602, a plurality of updates are received in an FPGA 14 from an external iterative linear solver. The plurality of updates may be received by a communication destination element 16. In connection with step 604, the plurality of updates are stored in an update storage element 18. The updates may be forwarded from the communication destination element 16.

In connection with step 606, the absolute value of each of the plurality of updates is determined utilizing an absolute value converter 20. The updates may be forwarded from the update storage element 18. In connection with step 608, the absolute value of the plurality of updates is accumulated utilizing a summation unit 22. The absolute value of the plurality of updates may be received from the absolute value converter 20.

In connection with step 610, the accumulated value is compared to a convergence factor utilizing a comparator 26. The accumulated value may be received from the summation unit 22 and compared to N-epsilon. In connection with step 612, a solution signal 42 is generated if the accumulated value is less than the convergence factor.

In connection with step 614, the signal 42 is transmitted to the iterative linear solver. With step 616, the calculation of a solution for the current matrix equation within the iterative linear solver is interrupted. With step 618, the calculation of a solution for a new matrix equation within the iterative linear solver is initiated.

to initiate the calculation of a solution for a new matrix equation. The iterative linear solver may cease its current calculations and receive the data set for the new matrix equation.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for evaluating the convergence to a solution for a matrix equation including an A-matrix with a plurality of elements whose values are known, an x-vector with a plurality of elements whose values are unknown, and a b-vector with a plurality of elements whose values are known, the system comprising:
 at least one field programmable gate array (FPGA), including a plurality of configurable logic elements and a plurality of configurable storage elements;
 a conversion element formed from the configurable logic elements and configured to determine the absolute value of each of a plurality of updates, each update being received from an iterative linear equation solver and representing a difference between a solution value of an element of the x-vector from a current iteration and the solution value of the element of the x-vector from a previous iteration;

a summation unit formed from the configurable logic elements and configured to accumulate the absolute value of the plurality of updates to form a total sum;

an epsilon storage element formed from the configurable logic elements and configurable storage elements and configured to generate a convergence factor which varies based on the x-vector input and corresponds to a maximum acceptable total of the differences and is proportional to the number of elements of the x-vector; and a comparator formed from the configurable logic elements and configured to compare the total sum to the convergence factor.

2. The system of claim 1, wherein the comparator generates a signal if the accumulation of the absolute value of the plurality of updates is less than a convergence factor.

3. The system of claim 1, further including a first storage element formed from the configurable storage elements and configured to store the plurality of updates.

4. The system of claim 3, further including a communication receiving element configured to receive the plurality of updates and supply the plurality of updates to the first storage element.

5. The system of claim 1, further including a second storage element formed from the configurable storage elements and configured to store the convergence factor.

6. A system for evaluating the convergence to a solution for a matrix equation including an A-matrix with a plurality of elements whose values are known, an x-vector with a plurality of elements whose values are unknown, and a b-vector with a plurality of elements whose values are known, the system comprising:

a plurality of field programmable gate arrays (FPGAs), each including a plurality of configurable logic elements and a plurality of configurable storage elements;

a plurality of update summation units each including—
   a storage element formed from the configurable storage elements and configured to store a portion of a plurality of updates, each update being received from an iterative linear equation solver and representing a difference between a solution value of an element of the x-vector from a current iteration and the solution value of the element of the x-vector from a previous iteration,
   a conversion element formed from the configurable logic elements and configured to determine the absolute value of each of the portion of the plurality of updates, and
   a first summation unit formed from the configurable logic elements and configured to accumulate the absolute value of the portion of the plurality of updates to form a partial sum; and a global convergence unit including—
   a second summation unit formed from the configurable logic elements and configured to accumulate the partial sums from each update summation unit to form a total sum,
   an epsilon storage element formed from the configurable logic elements and configurable storage elements and configured to generate a convergence factor which varies based on the x-vector input and corresponds to a maximum acceptable total of the differences and is proportional to the number of elements of the x-vector; and
   a comparator formed from the configurable logic elements and configured to generate a signal if the total sum is less than the convergence factor.

7. The system of claim 6, wherein each of the plurality of update summation units further includes a communication receiving element configured to receive the plurality of updates and supply the plurality of updates to the storage element.

8. The system of claim 6, wherein each of the plurality of update summation units further includes a communication transmitting element configured to transmit the partial sum to the global convergence unit.

9. The system of claim 6, wherein the global convergence unit further includes a communication receiving element configured to receive the plurality of partial sums from the plurality of update summation units and supply the partial sums to the second summation unit.

10. The system of claim 6, further including a plurality of inter FPGA links, each inter FPGA link included within one FPGA and configured to allow communication from one FPGA to another FPGA.

11. A method of evaluating the convergence to a solution for a matrix equation including an A-matrix with a plurality of elements whose values are known, an x-vector with a plurality of elements whose values are unknown, and a b-vector with a plurality of elements whose values are known, the method comprising the steps of:

a) receiving in a field programmable gate array (FPGA) a plurality of updates from an external iterative linear solver, each update representing a difference between a solution value of an element of the x-vector from a current iteration and the solution value of the element of the x-vector from a previous iteration;

b) determining the absolute value of each of the plurality of updates utilizing a conversion element in the FPGA;

c) accumulating the absolute value of the plurality of updates utilizing a summation unit in the FPGA;

d) generating a convergence factor which varies based on the x-vector input and corresponds to a maximum acceptable total of the differences and is proportional to the number of elements of the x-vector;

e) comparing the accumulated value to the convergence factor utilizing a comparator in the FPGA; and f) generating a signal if the accumulated value is less than the convergence factor.

12. The method of claim 11, further including the step of storing the plurality of updates in a storage element in the FPGA.

13. The method of claim 11, further including the step of transmitting the signal to the iterative linear solver.

14. The method of claim 13, further including the step of interrupting the calculation of a solution for the current matrix equation within the iterative linear solver.

15. The method of claim 14, further including the step of initiating the calculation of a solution for a new matrix equation within the iterative linear solver.

16. The method of claim 11, wherein the convergence factor is related to the number of elements in an unknown vector of the matrix equation.

17. The system of claim 1, wherein the convergence factor is a product of a number of elements of the x-vector and an epsilon.

18. The system of claim 6, wherein the convergence factor is a product of a number of elements of the x-vector and an epsilon.

19. The method of claim 11, wherein the convergence factor is a product of a number of elements of the x-vector and an epsilon.

* * * * *